United States Patent
Rietzler

(10) Patent No.: US 7,229,022 B2
(45) Date of Patent: Jun. 12, 2007

(54) METHOD FOR PRODUCING A CONTACTLESS CHIP CARD AND CHIP CARD PRODUCED ACCORDING TO SAID METHOD

(75) Inventor: Manfred Rietzler, Marktoberdorf (DE)

(73) Assignee: Intec Holding GmbH, Marktoberdorf (DE)

( * ) Notice: Subject to any disclaimer, the term of this patent is extended or adjusted under 35 U.S.C. 154(b) by 0 days.

(21) Appl. No.: 10/472,688

(22) PCT Filed: Mar. 16, 2002

(86) PCT No.: PCT/DE02/00949

§ 371 (c)(1),
(2), (4) Date: Mar. 30, 2004

(87) PCT Pub. No.: WO02/077918

PCT Pub. Date: Oct. 3, 2002

(65) Prior Publication Data

US 2004/0155114 A1 Aug. 12, 2004

(30) Foreign Application Priority Data

Mar. 22, 2001 (DE) ................. 101 14 355

(51) Int. Cl.
*G06K 19/06* (2006.01)
(52) U.S. Cl. ...................... 235/492; 235/488
(58) Field of Classification Search ........... 235/492, 235/375, 380, 486, 488; 361/736, 737; 438/106, 438/125
See application file for complete search history.

(56) References Cited

U.S. PATENT DOCUMENTS

| | | | | | |
|---|---|---|---|---|---|
| 4,171,477 | A | * | 10/1979 | Funari | 219/56.21 |
| 5,852,289 | A | * | 12/1998 | Masahiko | 235/492 |
| 5,989,994 | A | * | 11/1999 | Khoury et al. | 438/615 |
| 6,036,099 | A | * | 3/2000 | Leighton | 235/488 |
| 6,319,827 | B1 | * | 11/2001 | Kowalski et al. | 438/666 |
| 6,323,064 | B1 | * | 11/2001 | Lee et al. | 438/117 |
| 6,601,770 | B1 | * | 8/2003 | Ikefuji et al. | 235/492 |
| 6,677,186 | B1 | * | 1/2004 | Zafrany et al. | 438/125 |
| 6,957,481 | B1 | * | 10/2005 | Patrice | 29/600 |

* cited by examiner

*Primary Examiner*—Ahshik Kim
(74) *Attorney, Agent, or Firm*—Proskauer Rose LLP

(57) ABSTRACT

The invention relates to a method for producing a transponder, especially a contactless chip card (1) comprising at least one electronic component (chip module 2) and at least one antenna (3); the at least one electronic chip component (2) being disposed on a non-conducting substrate that serves as a support for the component. The at least one antenna is also disposed on a non-conducting substrate, the at least one electronic component (2) being applied to a first substrate and the antenna (3) on a second substrate. The entire circuit (1) is then produced by joining the individual substrates so that they are correctly positioned relative to each other. The components (2, 3) are contacted once the different substrates have been joint by means of auxiliary materials such as solder or glue, or without auxiliary materials by microwelding. The non-conducting substrates form a base card body.

9 Claims, 4 Drawing Sheets

METHOD FOR PRODUCING A CONTACTLESS CHIP CARD AND CHIP CARD PRODUCED ACCORDING TO SAID METHOD

RELATED DOCUMENTS

This patent application is the U.S. national stage of the international patent application PCT/DE02/00949 filed Mar. 16, 2002, published as WO-02/077918 A2, designated for the U.S., which document is fully incorporated by reference.

TECHNICAL FIELD OF THE INVENTION

The present invention relates to a method for making a transponder unit with at least one chip and an antenna, in particular, for making a contactless chip card and a transponder unit according to said method.

BACKGROUND OF THE INVENTION APPLICATION

DESCRIPTION OF THE PRIOR ART

Contactless chip cards, in the simplest case, comprise two electrical components, namely, a chip module and an electrically conductive antenna connected with the chip module. In complex embodiments, further components, such as, for example, further microchips for data storage, optical displays, batteries, etc., can be integrated in the chip card. These electronic components are mounted on an electrically non-conductive base substrate, which typically comprises plastic, is built-into the card, and thus forms a component of the card. With methods known, the chips are processed in part when not insulated, that is, the silicon chip is not accommodated additionally in a housing. In part, on the other hand, the silicon chips, however, are previously built into a corresponding housing. The housed chip is then generally designated as a chip module. Subsequently, with the term "chips", unhoused as well as housed varieties are meant. Since the card manufacture takes place, in practice, in a multiple slit-up manner, multiple transponder units are arranged on a base substrate. The arrangement takes place in a uniform, screen-type arrangement, whereby arrangements of approximately 3×8, or 6×6 are the common size used.

As the closest state of the art, a method for arranging a transponder unit having at least one chip and a wire coil on a substrate is known from DE 44 10 732 C2. With the method proposed there for making a contactless chip card, a single substrate layer is used in order build the various components thereon. In this manner, the antenna is mounted as the first component on the substrate, as with all other known methods. Thus, three different methods must be distinguished, namely, the etching method, the printing method and the wire-laying method. With etching methods, the base substrate is coated over its entire surface with copper. In a following photolithography process, the coil is represented and the excess copper etched off. With printing methods, the coil contour is imprinted by means of electrically conductive tints or pastes. In practice, screen printing methods are used. With wire-laying methods, electrically conductive wire is mounted along the coil contour on a substrate and there, attached spot-wise, or along the complete contour onto this.

With methods known, like the known method of DE 44 10 732, in which only a single substrate layer is used, the next step is mounting the chip module and the further electronic components, whereby with all known methods, the components are mounted onto the same substrate. The mounting of the components takes place, such that the contact surface of the components is congruent with the contact surface of the previously mounted components. Mounting of the components takes place sequentially. Next, the electrical contact of the components takes place. In this regard, the contact surfaces of the individual components are connected with one another. The following processes are used: solders, electrically conductive adhesion, and TC bonds, which is also called micro-welding. With solders, supplementary solder material is applied between the connection points of the components and after the component assembly, thermally remelted. With conductive adhesion, an electrically conductive adhesive is applied additionally between the components, which is hardened after the component assembly. The hardening takes place in practice under the effect of temperature or UV light. With TC bonds, the contact takes place without additional application of contact material. In this regard, the two contact materials are welded with one another by means of a temporary impact of heat.

The known methods, in particular, the method according to DE 44 10 732, however, is connected with disadvantages, whereby as a first disadvantage, the rate of yield must be named. When a not implausible error occurs, namely with the second step of mounting the chip onto the common substrate, the entire previously made product of the method is unusable, a disadvantage that is overcome with the present invention. In addition, the method according to DE 44 10 732 is associated with the disadvantage of a low degree of modularity, since the substrate impacted with the coil and chip an only be made as a whole, that is, as a unitary product of a modular manufacture, it is not accessible, or is only very difficultly accessible.

OBJECT OF THE INVENTION

The noted disadvantages of a method for producing a transponder unit with at least one chip and an antenna, in particular, for producing a contactless chip card are overcome by the present invention.

SUMMARY OF THE INVENTION

The invention solves the problem by a method for producing a transponder or contactless chip card, said transponder or contactless chip comprises a first non-conductive substrate and a second non-conductive substrate, an electronic component and an antenna, said first and said second non-conductive substrate having essentially the same outer boundaries, said method comprises the steps of arranging said electronic component on said first non-conductive substrate serving as a component support, arranging said antenna on said second non-conductive substrate, and thereafter, by means of correct and accurate positional assembling the individual substrates, producing the total switching mechanism by laminating the substrate layers using heat and thereby melting of the various substrate layers so that a hermetically sealed connection with internal electronics is provided, wherein said non-conductive substrates forms a base card body after assembly.

The individual components, in particular, the coil and the chip, are mounted on different substrates and are mounted separately from one another. In this manner, the features of the invention first have the result that with an error, for example, upon mounting the chip on the corresponding substrate, most significantly, these parts are unusable, while the separately made antenna unit, in which a substantial constructional expense is made, is not affected by such an error. In addition, the features of the invention have the result that the antenna unit, comprising the second substrate and the antenna coil, can be prepared independently from the chip, so that an antenna unit for various chip parts, comprising the substrate and a chip mounted on the first substrate or countersunk thereon can be used. This is significant, since various chip parts may be different by means of the software or different data used therein. The advantages of the method of the present invention lie in the very efficient manufacture of contactless cards. In that the various components are arranged on different substrates, the different production steps can be performed on different equipment. In this manner, each type of equipment can be adapted optimally for production performance. The assembly of the individual substrate layers takes place entirely at the conclusion of the assembly process, according to which, already all time-intensive process involving component-fitting are completed. An essential advantage of the method according to the present invention lies in the improved rate of yield of the entire process, since each individual substrate can be tested on its function with the associated component before complete assembly and processed further, if necessary. With the manufacture according to the present invention, on the one hand, an antenna substrate is used, which can be made by means of etching technology, printing technology, or wire-laying technology and which supports all antennae of the planned application. On the other hand, a separate substrate is made and used, on which all chip modules of the intended application are premounted. In this regard, the chips are mounted onto the substrate according to their later position in the entire structure and fixed there. The fixing can take place by means of adhesive. In this connection, the adhesive can be applied either already on the substrate or on the chip module. By corresponding pressing-on of the chip module onto the substrate, the adhesive is activated, and if necessary, is hardened by means of the action of heat or UF light action. The fixing of the chip module on the second substrate, however, alternatively can take place by means of ultra-sound action. In this manner, a "rubbing in" of the chip module surface into the substrate takes place. If additional components are needed in the contactless card, these can either be mounted on the same substrate on which the chip module is already mounted. However, with certain embodiments, it also can be advantageous to mount the further components on further, separate substrates. In order to build the entire switching mechanism, the individual substrates are assembled in a positionally-accurate manner and pressed with one another. The merging of the substrates must take place, such that the contact surfaces of the components are congruent with the contact surfaces of the components of the next substrate. The electrical contact of the components is positively achieved with the joining and pressing of the substrates. In this manner, all of the contacting steps can be processed without additional steps, or alternatively, after the joining, an additional contacting step can be performed. All three of the previously noted contact methods can be applied. The pressing of the substrate layers, in practice, is performed with heat and is hereby called laminating. In this manner, a melting of the various substrate layers takes place so that a hermetically sealed connection with internal electronics is provided. This connection can be further processed then already as the card base body. Thin components are simply "sunken" into the substrate layers upon pressing and melted down. With the use of thicker components, in particular, of thick chip modules, however, alternatively a further substrate layer can be inserted in the structure, whereby this substrate layer does not support its own components, rather, merely has recesses. The recesses are arranged, such that the raised regions of the thick components come to rest therein. These so-called equalizing layers are formed as an individual substrate between the other substrate layers and further processes.

According to a second aspect of the invention a transponder unit or a chip card is defined, comprising a first non-conductive substrate and a second non-conductive substrate, an electronic component and an antenna, said first and said second non-conductive substrate having essentially the same outer boundaries, whereby said electronic component is arranged on a first non-conductive substrate serving as a component support, and said antenna also is arranged on said second non-conductive substrate, wherein said transponder unit is produced by the correct positional assembly of the individual substrates.

The previously described and claimed elements to be used in the subsequent embodiments are subject to no particular excepted conditions in regard to their size, styling, material use, and technical conception, so that the selection criteria known in the respective application can find unlimited use. Further characteristics, features, and advantages of the subject matter of the present invention are provided in the subsequent description of the accompanying drawings, in which, by way of example, a method for the present invention is explained.

DETAILED DESCRIPTION OF THE PREFERRED EMBODIMENTS

Figure 1:
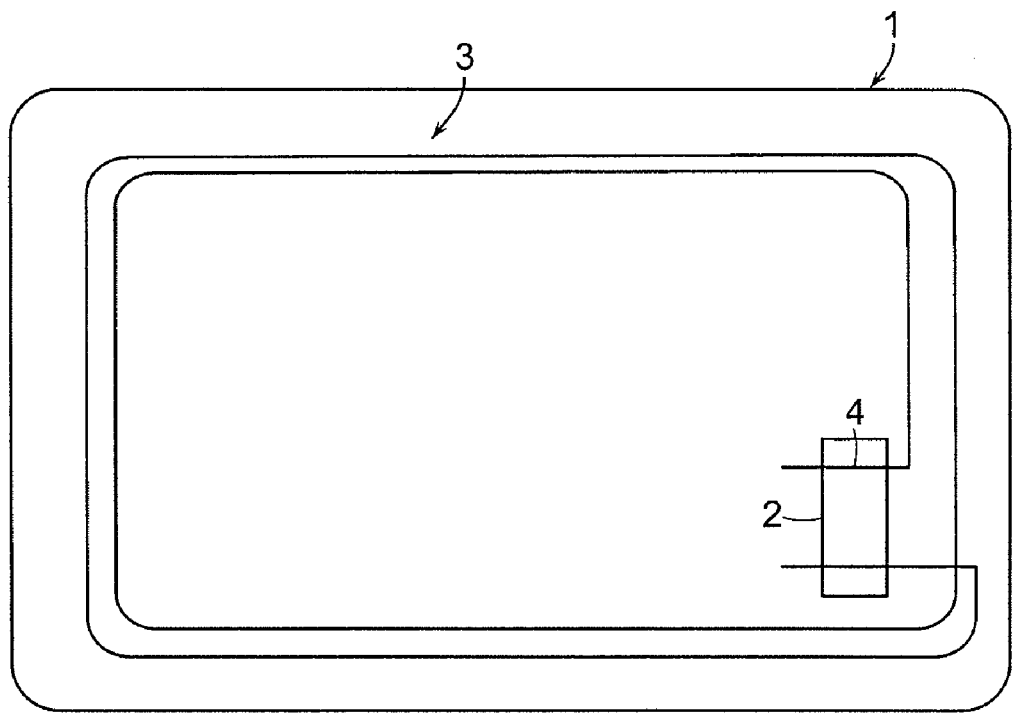
FIG. 1 shows the plan view of a contactless card and its internal components.

FIG. 1 shows an embodiment of a contactless chip card. The outer contour 1 of the card corresponds to the standard contour for chip cards, as described in ISO Norm 7816. In the interior of the card, the chip module 2 and the antenna 3 are located.

In the illustrated embodiment, the antenna 3 is made by means of wire-laying technology. In this manner, a wire conductor corresponding to the antenna contour is mounted on a substrate. On the point at which, upon joining the substrates, the contact surfaces of the antenna and chip module cover one another, the contact point 4 is provided. The electrical contact can exist purely by pressing onto one another. Alternatively, the above-described additional contact methods can be used. The thickness of the illustrated cards corresponds in practice to the thickness of ISO cards, such as those described in ISO Norm 7816.

Figure 2:
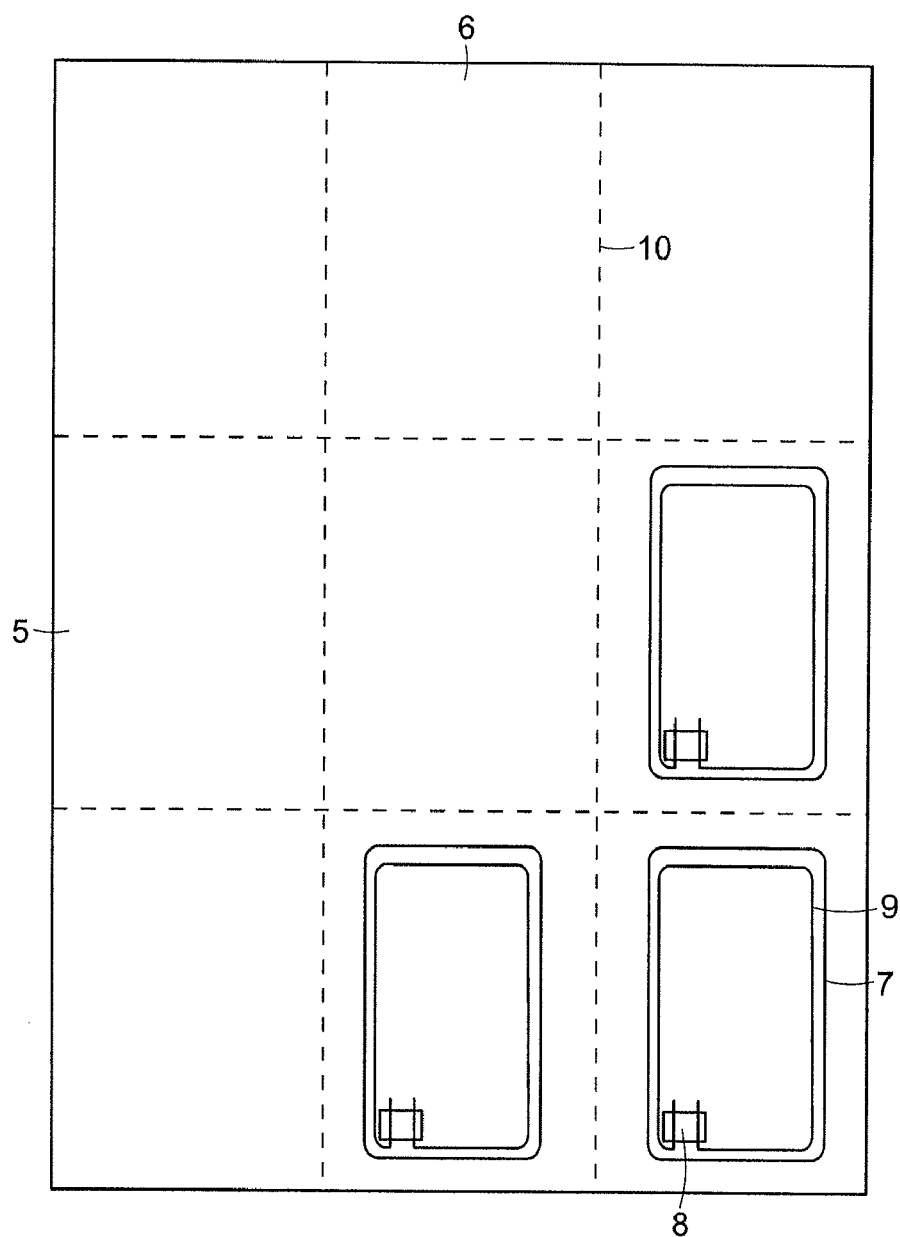
FIG. 2 shows the plan view of the deployment arrangement of contactless cards during the manufacturing process.

FIG. 2 shows the use arrangement of the individual transponders during the manufacture of the contactless cards. The describe substrates are not designed here for each individual card, rather arranged in larger formats. In the industry, typical use formats are 3×8 or 6×6. In addition, many further different formats are provided.

The arrangement of the transponders takes place in a screen-type manner with constant spacing in the longitudinal direction 5 and in the transverse direction 6. For simplicity, the illustration is pictured in FIG. 2 only as a 3×3 use format. The embodiment of the individual transponders 7 on the use is completely identical. Each individual transponder hereby comprises a chip module 8 and an associated antenna 9. For improved orientation of the individual substrates, frequent assistance lines 10 are imprinted onto the substrate in order to facilitate the assembly. This assistance lines mark the exact intermediate space between the individual transponders on the substrate.

Figure 3:
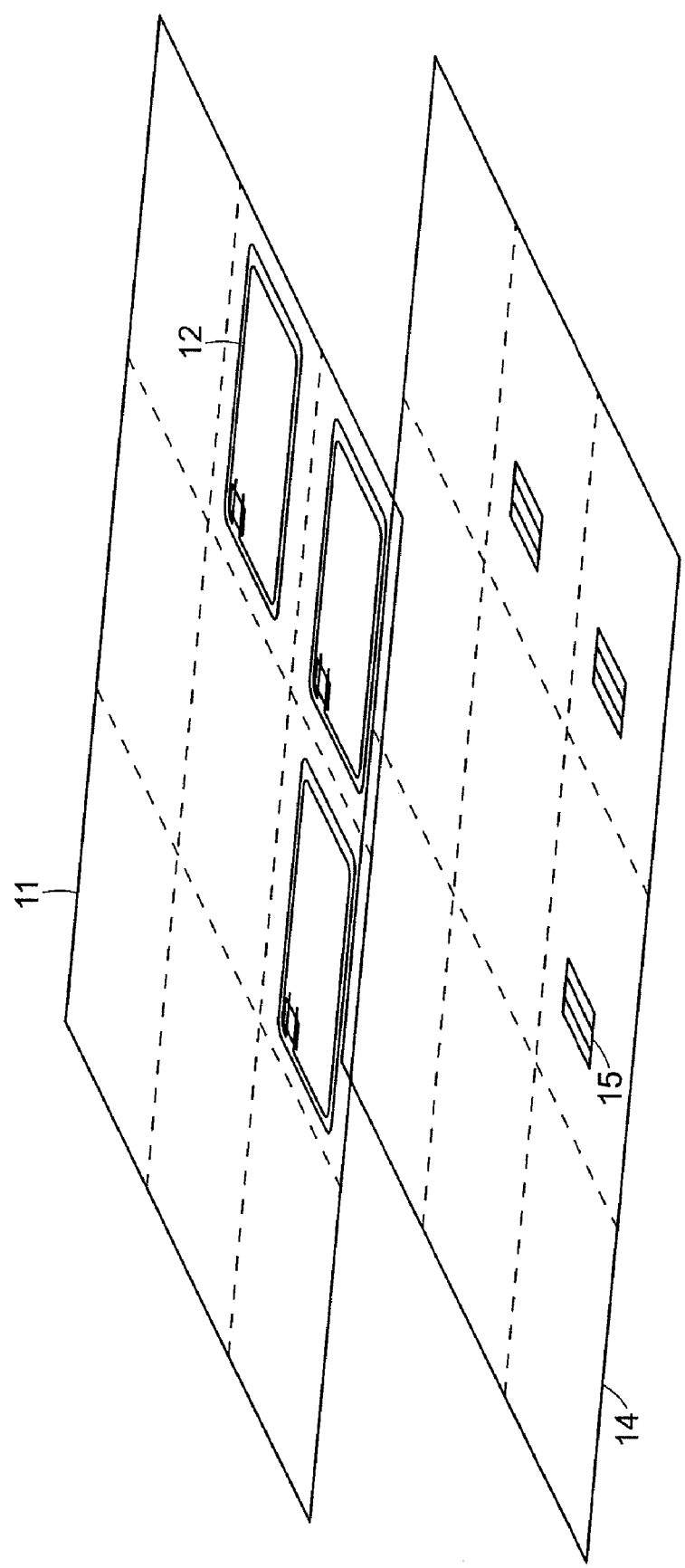
FIG. 3 shows the two substrate layers during the assembly.

FIG. 3 shows the individual substrate before the assembly in the use arrangement. Substrate 11 supports the antenna 12, whereby this is arranged exactly in the defined use arrangement and position. On the antenna substrate, assistance lines 13 can be applied, which simplify the orientation on one another of both substrates. The antennae 12 lie on the underside of the substrates, that is, on the side facing toward the second substrate. The second substrate 14 shows the substrate on which the chip modules 15 already are mounted. The chip modules are already fixed onto the substrate by means of the previously described method. The chip modules 15 lie on the top side, that is, on the side of the substrate facing the antennae 12.

For further processing, both substrates 11 and 14 are oriented to be correctly position and pressed onto one another.

Figure 4:
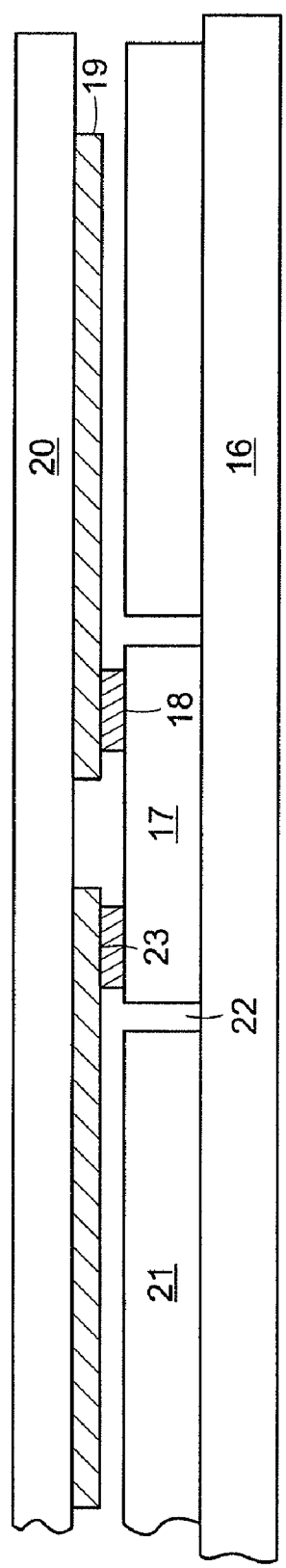
FIG. 4 shows the view of the joined substrates of a transponder in cross section.

FIG. 4 shows the view of the joined substrates of a transponder in cross section. One recognizes the lower substrate 16 on which the chip module 17 is arranged. Opposite is the upper substrate 20, which supports the antenna 19 on its underside. In the contact region 18, the antenna 19 and the contact surfaces 23 of the chip module overlap. At this point, the electrical connection is formed.

In this view, additionally an equalizing substrate 21 is shown. This substrate does not support any components, rather contains only an opening 22, in which the chip module 17 comes to rest after the assembly process.

The invention claimed is:

1. A method for producing a transponder or contactless chip card, said transponder or contactless chip card comprises a first non-conductive substrate and a second non-conductive substrate, an electronic component and an antenna, said first and said second non-conductive substrates having essentially the same outer boundaries, said method comprises the steps of:

arranging said electronic component on said first non-conductive substrate serving as a component support;

arranging said antenna on said second non-conductive substrate;

laminating the first substrate in direct contact with the second substrate using heat, thereby melting the first and second substrates so that said electronic component is countersunk into the substrates and a hermetically sealed connection is provided between said electronic component and said antenna, wherein said laminated non-conductive substrates forms a base card body, the thickness of the base card body being substantially equal to a sum of the thickness of the first substrate and the thickness of the second substrate.

2. The method according to claim 1, wherein said transponder or contactless chip card comprises multiple electronic components and multiple antennae.

3. The method according to claim 1, comprising the further step of contacting said electronic component arranged on said first substrate to said antenna arranged on said second substrate.

4. The method according to claim 3, wherein said step of contacting includes applying an auxiliary material between said electronic component and said antenna.

5. The method according to claim 3, wherein said step of contacting includes micro-welding said electronic component arranged on said first substrate to said antenna arranged on said second substrate without auxiliary materials.

6. The method according to claim 4 wherein the auxiliary materials includes a solder material or an adhesive.

7. A transponder unit or a chip card, comprising a first non-conductive substrate and a second non-conductive substrate, an electronic component and an antenna, said first and said second non-conductive substrates having essentially the same outer boundaries, whereby said electronic component is arranged on said first non-conductive substrate serving as a component support, and said antenna also is arranged on said second non-conductive substrate, wherein said transponder unit or said chip card is produced by laminating the first substrate in direct contact with the second substrate using heat, thereby melting the first and second substrates so that said electronic component is countersunk into the substrates and a hermetically sealed connection is provided between said electronic component and said antenna, the thickness of the transponder unit or the chip card being substantially equal to a sum of the thickness of the first substrate and the thickness of the second substrate.

8. The transponder unit according to claim 7, further comprising top layers, which are applied after the assembly of the substrate layers on the top or bottom side.

9. The transponder unit according to claim 8, wherein the transponder unit is integrated in a further housing.

* * * * *